US012210831B2

(12) United States Patent
Pochernina et al.

(10) Patent No.: US 12,210,831 B2
(45) Date of Patent: Jan. 28, 2025

(54) KNOWLEDGE BASE WITH TYPE DISCOVERY

(71) Applicant: Microsoft Technology Licensing, LLC, Redmond, WA (US)

(72) Inventors: Elena Pochernina, London (GB); John Winn, Cambridge (GB); Matteo Venanzi, London (GB); Ivan Korostelev, London (GB); Pavel Myshkov, London (GB); Samuel Alexander Webster, Cambridge (GB); Yordan Kirilov Zaykov, Cambridge (GB); Nikita Voronkov, Bothell, WA (US); Dmitriy Meyerzon, Bellevue, WA (US); Marius Alexandru Bunescu, Redmond, WA (US); Alexander Armin Spengler, Cambridge (GB); Vladimir Gvozdev, Sammamish, WA (US); Thomas P. Minka, Cambridge (GB); Anthony Arnold Wieser, Fen Ditton (GB); Sanil Rajput, San Francisco, CA (US); John Guiver, Saffron Walden (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 342 days.

(21) Appl. No.: 17/493,819

(22) Filed: Oct. 4, 2021

(65) Prior Publication Data

US 2023/0076773 A1 Mar. 9, 2023

Related U.S. Application Data

(63) Continuation-in-part of application No. 17/460,123, filed on Aug. 27, 2021, now abandoned.

(51) Int. Cl.
*G06F 40/30* (2020.01)
*G06F 16/901* (2019.01)
*G06F 16/903* (2019.01)

(52) U.S. Cl.
CPC .......... *G06F 40/30* (2020.01); *G06F 16/9024* (2019.01); *G06F 16/90335* (2019.01)

(58) Field of Classification Search
None
See application file for complete search history.

(56) References Cited

U.S. PATENT DOCUMENTS 6,006,242 A 12/1999 Poole et al.
6,591,258 B1 7/2003 Stier et al.
(Continued)

OTHER PUBLICATIONS

"Final Office Action Issued in U.S. Appl. No. 15/898,211", Mailed Date: Oct. 26, 2022, 51 Pages.
(Continued)

*Primary Examiner* — Jonathan C Kim
(74) *Attorney, Agent, or Firm* — Barta Jones, PLLC

(57) ABSTRACT

In various examples there is a computer-implemented method of database construction. The method comprises storing a knowledge graph comprising nodes connected by edges, each node representing a topic. Accessing a topic type hierarchy comprising a plurality of types of topics, the topic type hierarchy having been computed from a corpus of text documents. One or more text documents are accessed and the method involves labelling a plurality of the nodes with one or more labels, each label denoting a topic type from the topic type hierarchy, by, using a deep language model; or for an individual one of the nodes representing a given topic, searching the accessed text documents for matches to at least one template, the template being a sequence of words and containing the given topic and a placeholder for a topic type;
(Continued)

and storing the knowledge graph comprising the plurality of labelled nodes.

20 Claims, 10 Drawing Sheets

(56) References Cited

U.S. PATENT DOCUMENTS

| | | | |
|---|---|---|---|
| 6,601,055 | B1 | 7/2003 | Roberts et al. |
| 7,082,430 | B1* | 7/2006 | Danielsen ............... G06F 16/27 |
| 7,096,210 | B1 | 8/2006 | Kramer et al. |
| 7,502,770 | B2 | 3/2009 | Hillis et al. |
| 7,756,810 | B2 | 7/2010 | Nelken et al. |
| 8,103,598 | B2 | 1/2012 | Minka et al. |
| 8,275,737 | B2 | 9/2012 | Kupershmidt et al. |
| 9,251,467 | B2 | 2/2016 | Winn et al. |
| 9,842,166 | B1* | 12/2017 | Leviathan ........... G06F 16/9024 |
| 9,864,795 | B1 | 1/2018 | Halevy et al. |
| 10,504,198 | B1* | 12/2019 | Ward ..................... G16H 70/20 |
| 10,679,008 | B2 | 6/2020 | Dubey et al. |
| 10,783,162 | B1* | 9/2020 | Montague .......... G06F 16/2465 |
| 11,244,113 | B2* | 2/2022 | Adderly .............. G06F 16/3346 |
| 11,809,460 | B1* | 11/2023 | Rausch ................. G06F 16/287 |
| 2003/0177115 | A1 | 9/2003 | Stern et al. |
| 2004/0059966 | A1 | 3/2004 | Chan et al. |
| 2004/0095374 | A1 | 5/2004 | Jojic et al. |
| 2004/0260692 | A1 | 12/2004 | Brill et al. |
| 2005/0086222 | A1 | 4/2005 | Wang et al. |
| 2005/0154690 | A1* | 7/2005 | Nitta ....................... G06F 16/30 |
| | | | 707/E17.058 |
| 2010/0077324 | A1 | 3/2010 | Harrington et al. |
| 2011/0119050 | A1 | 5/2011 | Deschacht et al. |
| 2011/0251984 | A1 | 10/2011 | Nie et al. |
| 2011/0307435 | A1 | 12/2011 | Overell et al. |
| 2012/0203752 | A1 | 8/2012 | Ha-thuc et al. |
| 2014/0201126 | A1 | 7/2014 | Lotfi |
| 2014/0250046 | A1* | 9/2014 | Winn ....................... G06N 5/04 |
| | | | 706/52 |
| 2014/0280353 | A1* | 9/2014 | Delaney ................. G16H 10/60 |
| | | | 707/794 |
| 2014/0337306 | A1* | 11/2014 | Gramatica .......... G06F 16/9535 |
| | | | 707/706 |
| 2015/0006501 | A1* | 1/2015 | Talmon ............... G06F 16/9024 |
| | | | 707/708 |
| 2015/0248222 | A1* | 9/2015 | Stickler .................. G06Q 10/06 |
| | | | 715/763 |
| 2016/0012020 | A1 | 1/2016 | Yonghoon et al. |
| 2016/0012122 | A1 | 1/2016 | Soares et al. |
| 2016/0063061 | A1* | 3/2016 | Meyerzon ............... G06F 16/93 |
| | | | 707/749 |
| 2016/0140445 | A1* | 5/2016 | Adderly .................. G06F 40/30 |
| | | | 706/52 |
| 2016/0323411 | A1* | 11/2016 | Lee ......................... G06Q 50/01 |
| 2017/0024652 | A1 | 1/2017 | Kipersztok |
| 2017/0199928 | A1 | 7/2017 | Zhang et al. |
| 2017/0235816 | A1* | 8/2017 | Livshits ................. G06F 16/285 |
| | | | 707/722 |
| 2017/0316322 | A1 | 11/2017 | Perincherry et al. |
| 2018/0060306 | A1* | 3/2018 | Starostin ................. G06F 40/30 |
| 2018/0075359 | A1* | 3/2018 | Brennan ................ G06N 5/022 |
| 2019/0081983 | A1 | 3/2019 | Teal |
| 2019/0155947 | A1 | 5/2019 | Chu et al. |
| 2019/0213484 | A1* | 7/2019 | Winn ..................... G06N 5/022 |
| 2020/0089802 | A1* | 3/2020 | Ronen ..................... G06V 40/16 |
| 2021/0026846 | A1* | 1/2021 | Subramanya ......... G06F 16/289 |
| 2021/0104234 | A1* | 4/2021 | Zhang ..................... G06F 40/30 |
| 2021/0157858 | A1* | 5/2021 | Stevens ................. G06F 40/237 |
| 2021/0191949 | A1* | 6/2021 | Sato ........................ G10L 25/54 |
| 2021/0209500 | A1* | 7/2021 | Hu ............................ G06N 5/04 |
| 2021/0312919 | A1* | 10/2021 | Sato .................... G06F 16/3329 |
| 2021/0326519 | A1* | 10/2021 | Lin ........................ G06F 40/169 |
| 2022/0019740 | A1* | 1/2022 | Meyerzon ............. G06F 40/295 |
| 2022/0261545 | A1* | 8/2022 | Lauber ................. G06F 16/355 |
| 2022/0300544 | A1* | 9/2022 | Potter ..................... G06N 3/088 |
| 2023/0030086 | A1* | 2/2023 | Martinez Ayala ....... G06N 5/02 |
| 2023/0067688 | A1* | 3/2023 | Pochernina ........... G06F 16/367 |
| 2023/0076773 | A1* | 3/2023 | Pochernina .......... G06N 3/0475 |
| 2023/0342629 | A1* | 10/2023 | Panda ...................... G06N 5/02 |

OTHER PUBLICATIONS

"Final Office Action Issued in U.S. Appl. No. 15/898,211", Mailed Date: Aug. 18, 2023, 42 Pages.

"Non Final Office Action Issued in U.S. Appl. No. 15/898,211", Mailed Date: May 16, 2022, 44 Pages.

Chu, et al., "KATARA: A Data Cleaning System Powered by Knowledge Bases and Crowdsourcing", In Proceedings of the ACM SIGMOD International Conference on Management of Data, May 27, 2015, 15 Pages.

Zhang, et al., "DeepDive: Declarative Knowledge Base Construction", In Journal of Communications of the ACM, vol. 60, Issue 5, Apr. 24, 2017, pp. 93-102.

Niu, et al., "DeepDive: Web-scale Knowledge-base Construction using Statistical Learning and Inference", In Journal of VLDS, vol. 12, Aug. 31, 2012, 4 Pages.

"Non Final Office Action Issued in U.S. Appl. No. 15/898,211", Mailed Date: Feb. 27, 2023, 54 Pages.

Conneau, et al., "Supervised Learning of Universal Sentence Representations from Natural Language Inference Data", In Proceedings of the Conference on Empirical Methods in Natural Language Processing, Sep. 7, 2017, pp. 670-680.

Jordan, et al., ""Machine learning: Trends, perspectives, and prospects"", In Journal of Science , vol. 349, Issue 6245, 2015, pp. 255-260.

Carlson, et al., "Toward an Architecture for Never-Ending Language Learning", In Proceedings of Twenty-Fourth AAAI Conference on Artificial Intelligence, Jul. 5, 2010, pp. 1306-1313.

Devlin, et al., "BERT: Pre-Training of Deep Bidirectional Transformers for Language Understanding", In Proceedings of Conference of the North American Chapter of the Association for Computational Linguistics: Human Language Technologies, vol. 1 (Long and Short Papers), Jun. 2009, pp. 4171-4186.

Dong, et al., "Knowledge Vault: A Web-Scale Approach to Probabilistic Knowledge Fusion", In Proceedings of 20th ACM SIGKDD International Conference on Knowledge Discovery and Data Mining, Aug. 24, 2014, pp. 601-610.

Klimt, et al., "The Enron Corpus: A New Dataset for Email Classification Research", In Publication of Springer, Sep. 20, 2004, pp. 217-226.

Liu, et al., "RoBERTa: A Robustly Optimized BERT Pretraining Approach", In Repository of arXiv:1907.11692v1, Jul. 26, 2019, 13 Pages.

Loshin, David, "Enterprise Knowledge Management: The Data Quality Approach—Chapter 1", In Publication of Morgan Kaufmann, 2001, 24 Pages.

Maedche, et al., "Ontologies for Enterprise Knowledge Management", In Journal of IEEE Intelligent Systems, vol. 18, Issue 2, Mar. 2003, pp. 26-33.

"Infer.NET 0.3", Retrieved from: https:/web.archive.org/web/20181013050802/https://dotnet.github.io/infer/, Oct. 13, 2018, 2 pages.

Radicati, et al., "Email Statistics Report, 2015-2019", Retrieved from: https://www.radicati.com/wp/wp-content/uploads/2015/02/Email-Statistics-Report-2015-2019-Executive-Summary.pdf, 2019, 4 Pages.

Sang, et al., "Introduction To The CoNLL-2003 Shared Task: Language-Independent Named Entity Recognition", In Proceedings of Seventh Conference on Natural Language Learning at HLT-NAACL, Jun. 12, 2003, 6 Pages.

Szekely, et al., "Building and Using a Knowledge Graph to Combat Human Trafficking", In Publication of Springer, Oct. 11, 2015, pp. 205-221.

Voigt, et al., "The EU General Data Protection Regulation (GDPR)", In Publication of Springer, Aug. 10, 2017, pp. 201-217.

(56) References Cited

OTHER PUBLICATIONS

Winn, et al., "Alexandria: Unsupervised High-Precision Knowledge Base Construction using a Probabilistic Program", In Proceedings of Automated Knowledge Base Construction, Nov. 17, 2018, 20 Pages.
Winn, et al., "Enterprise Alexandria: Online High-Precision Enterprise Knowledge Base Construction with Typed Entities", In Proceedings of 3rd Conference on Automated Knowledge Base Construction, Jun. 22, 2021, 13 Pages.
Yamada, et al., "LUKE: Deep Contextualized Entity Representations with Entity-aware Self-attention", In Proceedings of Conference on Empirical Methods in Natural Language Processing, Nov. 16, 2020, pp. 6442-6454.
Yangel, et al., "Belief Propagation with Strings", In Technical Report MSR-TR-2017-11, Feb. 2017, 9 Pages.
Zhang, CE, "DeepDive: A Data Management System for Automatic Knowledge Base Construction", A dissertation Submitted in Partial Fulfillment of the Requirements for the Degree of Doctor of Philosophy (Computer Sciences) at the University of Wisconsin, 2015, 205 Pages.
Zhang, et al., "ERNIE: Enhanced Language Representation with Informative Entities", In Proceedings of 57th Annual Meeting of the Association for Computational Linguistics, Jul. 28, 2019, pp. 1441-1451.
Rajput, et al., "Alexandria in Microsoft Viva Topics: from Big Data to Big Knowledge", Retrieved from: https://www.microsoft.com/en-us/research/blog/alexandria-in-microsoft-viva-topics-from-big-data-to-big-knowledge/, Apr. 26, 2021, 12 Pages.
Weikum, et al., "From Information to Knowledge: Harvesting Entities and Relationships from Web Sources", In Proceedings of Twenty-Ninth ACM SIGMOD-SIGACT-SIGART Symposium on Principles of Database Systems, Jun. 6, 2010, pp. 65-76.
Surdeanu, et al., "Overview of the English Slot Filling Track at the TAC2014 Knowledge Base Population Evaluation", In Proceedings of 7th Text Analysis Conference, Nov. 17, 2014, 15 Pages.
Schmitz, et al., "Open Language Learning for Information Extraction", In Proceedings of the Joint Conference on Empirical Methods in Natural Language Processing and Computational Natural Language Learning, Jul. 12, 2012, pp. 523-534.
Richardson, et al., "Markov Logic Networks", In Journal of Machine Learning, vol. 62, Issue 1, Jan. 27, 2006, pp. 107-136.
Reinanda, R., "Entity Associations for Search", A PhD Thesis Submitted in Dutch Research School for Information and Knowledge Systems, May 11, 2017, 184 Pages.
"International Search Report and Written Opinion Issued in PCT Application No. PCT/US2019/012237", Mailed Date: Mar. 28, 2019, 13 Pages.

Niu, et al., "Elementary: Large-scale Knowledge-base Construction via Machine Learning and Statistical Inference", In International Journal on Semantic Web and Information Systems, vol. 8, Issue 3, Jul. 1, 2012, 23 Pages.
Mitchell, et al., "Never-Ending Learning", In Proceedings of Twenty-Ninth AAAI Conference on Artificial Intelligence, Jan. 25, 2015, 9 Pages.
Minka, Thomas P., "Expectation Propagation for Approximate Bayesian Inference", In Proceedings of 17th Conference in Uncertainty in Artificial Intelligence, Aug. 2, 2001, pp. 362-369.
Hoffart, et al., "YAGO2: A Spatially and Temporally Enhanced Knowledge Base from Wikipedia", In Journal of Artificial Intelligence, vol. 194, Jan. 2013, pp. 28-61.
Gupta, et al., "Biperpedia: An Ontology for Search Applications", In Proceedings of VLDB Endowment, vol. 7, Issue 7, Mar. 2014, pp. 505-516.
Fader, et al., "Identifying Relations for Open Information Extraction", In Proceedings of the Conference on Empirical Methods in Natural Language Processing, Jul. 27, 2011, pp. 1535-1545.
Chaiken, et al., "SCOPE: Easy and Efficient Parallel Processing of Massive Data Sets", In Proceedings of VLDB Endowment, vol. 1, Issue 2, Aug. 23, 2008, pp. 1265-1276.
"Probabilistic-Programming.org", Retrieved from; https://web.archive.org/web/20171121223322/probabilistic-programming.org/wiki/Home, Retrieved on: Nov. 21, 2017, 4 Pages.
"Probabilistic Programming for Advancing Machine Learning", In Publication of Defense Advanced Research Projects Agency, Apr. 1, 2013, 47 Pages.
"Infer.NET 2.6", Retrieved from: http://infernet.azurewebsites.net, Nov. 25, 2014, 1 Page.
Non-Final Office Action mailed on Dec. 21, 2023, in U.S. Appl. No. 17/460,123, 52 pages.
Communication pursuant to Article 94(3) EPC Received for European Application No. 19701418.6, mailed on Mar. 25, 2024, 8 pages.
Reinanda. R., "UvA-DARE (Digital Academic Repository)." accessed on URL: https://pure.uva.nl/ws/files/12382976/Reinanda_Thesis_complete.pdf, May 11, 2017, 185 pages.
Nguyen, et al., "Query-driven on-the-fly knowledge base construction." Proceedings of the VLDB Endowment, vol. 11, Issue No. 1, 2017, pp. 66-79.
Non-Final Office Action mailed on May 31, 2024, in U.S. Appl. No. 15/898,211, 29 pages.
Final Office Action mailed on Dec. 5, 2024, in U.S. Appl. No. 15/898,211, 35 pages.
Qi, et al., "Measuring conflict and agreement between two prioritized knowledge bases in possibilistic logic", Fuzzy Sets and Systems, vol. 161, Issue 14, Jul. 16, 2010, pp. 1906-1925.
Summons to attend oral proceedings pursuant to Rule 115(1) received in European Application No. 19701418.6, mailed on Nov. 25, 2024, 10 pages.

* cited by examiner

FIG. 2

FIREFLY ↗ ☆
CAMPAIGN

ART DIRECTOR
DESIGNER FOR PRINT CAMPAIGN
PETER WU
PRODUCTION DESIGNER
VIDEO PRODUCTION SPECIALIST

SUGGESTED FILES AND...  SEE ALL

CAMPAIGN UPDATE Q4
CECIL FOLK EDITED YESTERDAY
CAMPAIGN MENTIONED 3 TIMES...
VIDEO PRODUCTION BRIEF
BJORN LINDH EDITED TODAY
CAMPAIGN MENTIONED 2 TIMES...

RELATED (5)  SEE ALL

BRAND AND MARKETING
ORGANISATION
DRIVES THE FIREFLY CAMPAIGN
ALIANZ MANUFACTURING
SUPPLIER
MENTIONED IN FIREFLY...

1. TYPE (CAMPAIGN) IS CALLED OUT
TO CLARIFY WHAT TYPE OF TOPIC THIS IS

2. SECTION FOR RELATED TOPICS
WITH TYPES CALLED OUT

FIG. 3

SharePoint

Topic center  Confidential
Home  Manage...  Getting...

+ New...  ✏ Edit...  🖼 Share...  ☆ Unfollow...

As a member of this product site

Breeze water bottle  ⬤ Produ...

Lorem ipsum dolor sit amet, cons
et dolore magna aliqua. Ut enim
aliquip ex ea commodo consequa
from FireflyCampaignBrief.doc Pinned people

- Miguel Gar...
  Marketing...
  Leads marketing...
  Pinned by Celeste...

Suggested people

- Cecil Folk
  Art director
  Responsible for...
  Shared campaign...

Published 10/11/2020

🔍 | ⓐ Al... | ⓒ Water | Camp... | ⓐ Jenn...

Similar products

- 🌐 Seasons Camping Tent
  Frequently mentioned in Breeze...
- ⚡ Tornado
  Similar people have contributed to...
- 🌐 Feather Lightweight Series
  Mentioned on this page...

People also search for

- ⓐ Alianz Manufacturing
  Supplier
- 🌐 Fireflies
  Campaign
- ⚡ Product Portfolio 2021
  Project
- 🌐 Water Campaign
  Campaign

Topic experts

- ⓐ Johnnie McConnell
  Project manager
- ⓐ George West
  Mechanical engineer
- ⓐ Anne Butler
  Production lead ncididunt ut labore
mco laboris nisi ut

- Celeste...
  Senior
  engineer
  duction lead...
  ned by Celeste...

- Bjorn Lindh
  Multimedia...
  graphics and...
  red 3 videos...

KNOWLEDGE BASE WITH TYPE DISCOVERY

CROSS-REFERENCE TO RELATED APPLICATION

This application is a continuation-in-part application of and claims priority to U.S. patent application Ser. No. 17/460,123, entitled "KNOWLEDGE BASE WITH TYPE DISCOVERY," filed on Aug. 27, 2021, the disclosure of which is incorporated herein by reference in its entirety.

BACKGROUND

Knowledge bases are databases storing facts about topics and relations between the topics. Existing knowledge bases are at least partly manually constructed and this makes it time consuming and expensive to scale up construction of knowledge bases and maintain the data in those knowledge bases. Forming knowledge bases which are accurate, up-to-date and complete remains a significant challenge.

In addition, retrieving knowledge from knowledge bases is challenging to achieve in a scalable manner so that results are retrieved in a practical time scale whilst also in a manner where the results are intuitive and useful for end users.

The embodiments described below are not limited to implementations which solve any or all of the disadvantages of known knowledge base construction apparatus.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computer-implemented method of updating a knowledge base with topic types in order to construct a database. The method comprises storing a knowledge graph comprising nodes connected by edges, each node representing a topic. Accessing a topic type hierarchy comprising a plurality of types of topics, the topic type hierarchy having been computed from a corpus of text documents. One or more text documents are accessed and the method involves labelling a plurality of the nodes with one or more labels, each label denoting a topic type from the topic type hierarchy, by, using a deep language model; or for an individual one of the nodes representing a given topic, searching the accessed text documents for matches to at least one template, the template being a sequence of words and containing the given topic and a placeholder for a topic type; and storing the knowledge graph comprising the plurality of labelled nodes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 2 is a schematic diagram of a user interface displaying a topic center page for accessing information from a knowledge base;

FIG. 3 is a schematic diagram of a user interface displaying a topic card for a topic and which shows a type of the topic;

FIG. 4 is another example of a topic center page for accessing information from a knowledge base and where a user is beginning a search of the knowledge base and receiving suggestions from the knowledge base;

FIG. 5 is a schematic diagram of a results page obtained by searching the knowledge base for resources from a specified topic;

Like reference numerals are used to designate like parts in the accompanying drawings.

DETAILED DESCRIPTION

Figure 1:
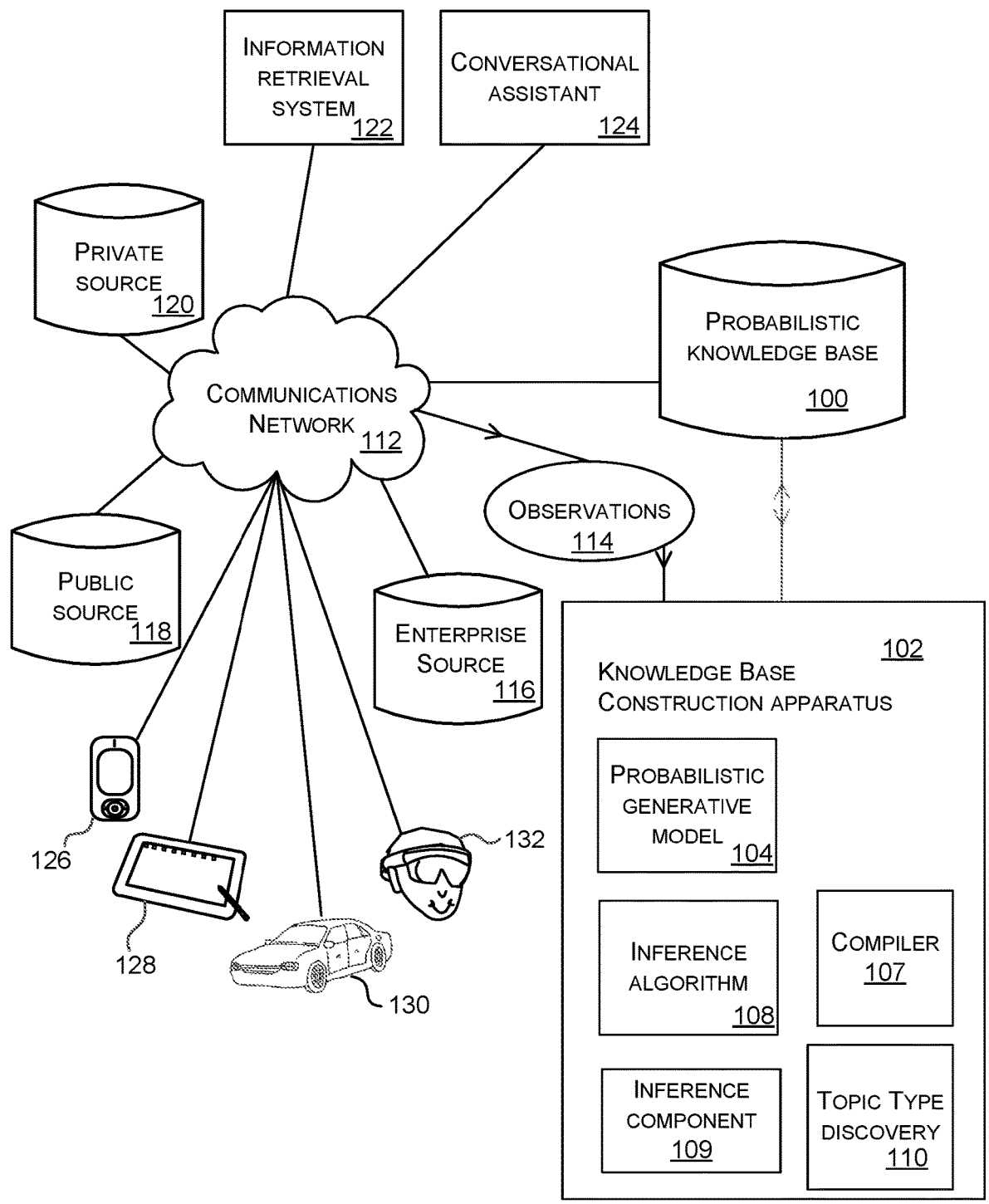
FIG. 1 is a schematic diagram of a knowledge base construction system.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples The present technology provides a system for automated, unsupervised, high-precision topic type discovery for use in knowledge base construction. By "unsupervised" it is meant that labelled training data is not essential in order to compute topic types and update a knowledge base using the computed topic types.

A non-exhaustive list of topic types is "project, team, program, service, organization, platform, solution, web service, site, service, industry, solution". A topic type is a property of a topic; that is, topics have a types property, which can take on zero, one or more of a fixed set of types. A topic is an entity with a set of properties and corresponding values. A non-exhaustive list of examples of topics is "Firefly, Planet Blue, Planet Red, Breeze Water Bottle".

The construction of a knowledge graph, such as an enterprise knowledge graph, involves the mining of topics relevant to the enterprise from documents owned by the enterprise. To make the knowledge graph more complete, the present disclosure describes a process to extract a set of multi-typed topics from a corpus of text documents in an unsupervised manner. The process is designed to learn a set of types associated with each topic and to update the knowledge base accordingly by labelling topic nodes with topic type labels or by introducing topic type nodes. In this way it is possible to improve the quality of the values inferred for existing properties of topics in the knowledge base. Such topic types do not necessarily match public entity types (e.g Wikidata types). Topic types are found to be useful not just generically, but to support work in particular industries and organizations.

Once the topic types are learnt and used to update the knowledge base, it is possible to query the knowledge base in a manner that takes into account topic types and which provides powerful results to end users and other entities using the knowledge base. In contrast, where topic types are unavailable in the knowledge base, end users find using the knowledge base difficult and find results returned from querying the knowledge base harder to interpret.

The topic type technology described herein is used with a probabilistic knowledge base. A probabilistic knowledge base is a knowledge base comprising a plurality of facts and where uncertainty about the facts is stored. The facts comprise values and one or more of the values may be missing or uncertain. In examples the probabilistic knowledge base is stored in the form of a knowledge graph comprising nodes connected by edges. An individual node represents a topic and has one or more properties as described in more detail later in this document. Proximity of nodes in the graph indicates a degree of similarity of topics with nodes denoting similar topics being closer in the graph than nodes denoting dissimilar topics.

FIG. 1 is a schematic diagram of a knowledge base construction system 102 connected to a probabilistic knowledge base 100. The knowledge base construction system 102 adds knowledge to probabilistic knowledge base 100 by mining observations 114 from one or more data sources 116, 118, 120. The observations 114 comprise text or other formatted data items. A formatted data item is data arranged in a specified spatial and/or temporal arrangement. Typical examples of formatted data items include, but are not limited to, unstructured text, or structured or formatted text (such a tabular item or emphasized text) as represented by a markup language, and other data types such as image, video, or audio items.

The knowledge base construction system 102 learns topic types from at least one corpus of text documents from one or more of a private source 120, a public source 118 and an enterprise source 116. Where the probabilistic knowledge base 100 is an enterprise knowledge base, the topic types are learnt from a corpus of text documents of the enterprise. Documents in the corpus mention topics and topic types.

The probabilistic knowledge base 100 is updated using the learnt topic types and so is more efficient to query where the queries relate to topic types. Since topic types are found to be particularly useful to end users the ability to directly represent topic types in the probabilistic knowledge base is very powerful. In addition, the topic types have associated probabilities since they are inferred from text documents as described in more detail below. The probabilities of the topic types are stored in the knowledge base and are used to affect what the user obtains when the user queries the knowledge base. In an example, a topic has a probability of x of being of topic type A and a probability of y of being of topic type B. When the knowledge graph is queried to find a particular topic then a rule is applied so that the topic is displayed as being of topic type A when x is 50% or more greater than y and otherwise the topic is displayed as being of either topic type A or topic type B.

In the example of FIG. 1 the probabilistic knowledge base 100 is accessible by an information retrieval system 122 and a conversational assistant 124. When an end user uses a smart phone 126, tablet computer 128, automated vehicle 130 or head worn augmented reality computer 132 to send a query to the information retrieval system 122, the information retrieval system 122 is able to query the probabilistic knowledge base to obtain topics, uncertainty of the topics and relationships between the topics as well as to find topic types and uncertainty of the topic types. The retrieved knowledge from the knowledge base is then incorporated into the results returned by the information retrieval system 122 to the computing device which requested it. In a similar manner a conversational assistant is able to receive natural language queries from computing entities such as the smart phone 126, tablet computer 128, automated vehicle 130 or head worn augmented reality computer 132 and is able to retrieve knowledge from the knowledge base in response to the natural language queries. The retrieved knowledge is then used by the conversational assistant to facilitate its understanding and reasoning and formulate useful and relevant replies to the natural language query.

The knowledge base construction system 102 comprises a probabilistic generative model 104, an inference algorithm 108, an inference component 109 and a topic type discovery component 110. The probabilistic generative model 104 is a process which generates text or other formatted data items from the probabilistic knowledge base 100. The probabilistic generative model 104 is most conveniently written as a probabilistic program, though may be written in a high-level language supporting constructs for probabilistic variables such as Infer.Net. Optionally, a compiler 107, such as that described in U.S. Pat. No. 8,103,598 "Compiler for Probabilistic Programs", Minka et al. issued on Jan. 24, 2012, assigned to Microsoft Technology Licensing LLC, may be used to compile the model into a probabilistic inference algorithm 108 able to respond to a set of inference queries on the model, or the inference algorithm may be manually constructed to respond to general classes of query. More detail about the probabilistic generative model 104 is given later in this document.

In the embodiments described herein the inference component 109 carries out inference using the inference algorithm 108 in either a forward direction whereby text or other formatted data is generated from the knowledge base, or a reverse direction whereby text or other formatted data is observed and at least one unobserved variable of the probabilistic generative model is inferred.

The inference component 109 carries out inference using the observations 114 and the inference algorithm 108. The results of the inference component 109 comprise probability distributions of at least one of the variables in the probabilistic program. The inference component 109 uses standard inference algorithms such as expectation propagation, or Variational Message Passing, or other standard inference algorithms which are well known to the skilled person. Inference over string values is handled using weighted automata as known to the skilled person and described in U.S. Pat. No. 9,251,467 entitled "Probabilistic parsing" and assigned to Microsoft Technology Licensing, LLC and also in "Belief Propagation with Strings" by Yangel et al. Technical Report MSR-TR-2017-11, Microsoft Research, February 2017. Other methods of inference over string values are used in some cases.

FIGS. 2 to 5 show graphical user interfaces of an information retrieval system 122 which uses the probabilistic knowledge base 100 having topic type information. FIGS. 2 to 5 demonstrate how useful it is to have topic type information in the probabilistic knowledge base since end users are intuitively and simply able to query the probabilistic knowledge base. As a result of having topic type information in the probabilistic knowledge base, efficient querying of topic types is possible. Where topic type information is not present in the probabilistic knowledge base the ability to query by topic type as well as much of the functionality demonstrated in FIGS. 2 to 5 is not possible.

Figure 2:
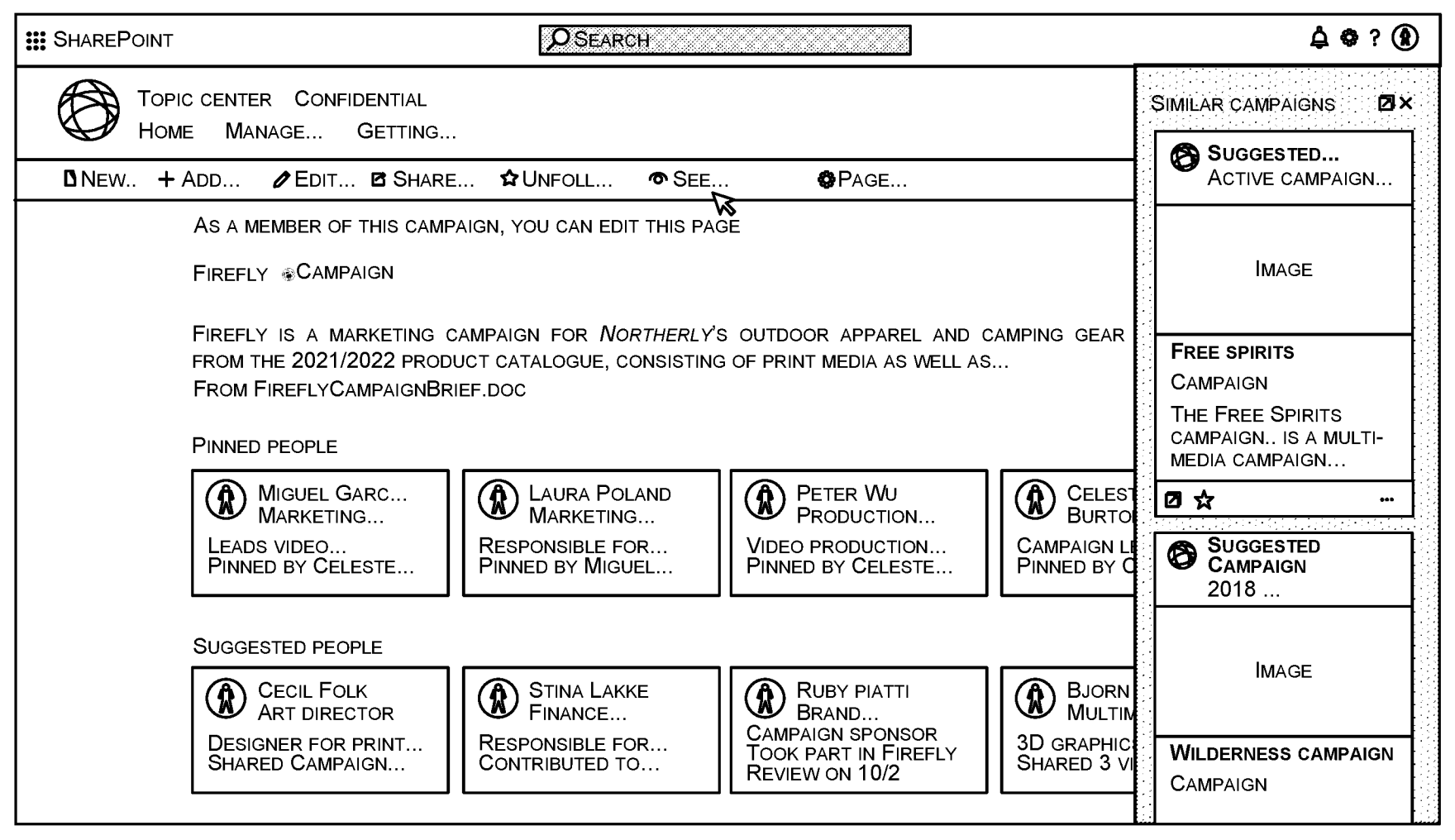

FIG. 2 is a schematic diagram of a user interface displaying a topic center page for accessing information from a knowledge base. The topic center page has a search query box at the top centre where an end user is able to enter query terms to query the knowledge base. In the example of FIG. 2 the topic centre page is displaying information about a topic called FIREFLY and displays a type of the topic next to the topic name FIREFLY. In this case the type of the topic is CAMPAIGN. The topic name and/or topic type have been automatically obtained from text documents using the methods described herein and stored in the knowledge base. The automatically derived topic types are found to be particularly intuitive and useful to end users who are able to more easily understand and navigate the knowledge base as a result.

Text describing the topic is presented under the topic name. The topic has one or more properties which are stored in the knowledge base and information about those properties is retrieved and displayed on the user interface. One of the properties is PEOPLE and so information about people who are pinned to the topic FIREFLY are displayed (in this case Joe Bloggs and Jane Example). Information about two suggested people (A Smith, Sarah Lane) is also displayed. The information about the suggested people is obtained from the knowledge graph by looking at the properties stored in association with neighboring topic nodes in the graph. In this way end users quickly and efficiently obtain information about a topic of a given type.

In the example of FIG. 2 the user has moved a cursor to select a menu item "see similar campaigns". As a result, a query is sent to the knowledge base to find topics with topic type CAMPAIGN and which are similar to the FIREFLY topic as a result of being close in the knowledge graph. The results of the query are presented in a panel on the right hand side of the display as indicated in FIG. 2. As a result the end user obtains information from the knowledge base in an efficient manner since the only user action involved is to move the cursor to select the menu item "see similar campaigns".

FIG. 3 is a schematic diagram of a user interface displaying a topic card for a topic and which shows a type of the topic. The topic and/or topic type have been automatically inferred from text documents using the methods described herein. In the example of FIG. 3 the topic card is for the topic FIREFLY and below the topic name on the topic card is the topic type (in this case CAMPAIGN). The topic card displays a summary of properties of the topic from the knowledge base, including information about people associated with the topic, information about suggested files and pages associated with the topic and information about related topics. The topic card is a compact visual representation of information from the knowledge base which has been inferred automatically from text documents. The topic card is scrollable to reveal more content.

FIG. 4 is another example of a topic center page for accessing information from a knowledge base and where a user is beginning a search of the knowledge base and receiving suggestions from the knowledge base. In FIG. 4 the user is viewing the topic center page which is currently displaying information about a topic called "Breeze water bottle". The type of the topic is PRODUCT and is displayed next to the topic name near the top left of the page. The topic type PRODUCT has been automatically inferred from text documents in some examples. Below the topic name is text summarizing and describing the topic. Information about people pinned to the topic and information about people suggested for the topic is also given.

The user has placed a cursor in a search query box at the top of the topic center page. As a result the knowledge base is queried to obtain query suggestions. A drop down box appears containing search query suggestions comprising similar products, items the other people also searched for from the Breeze water bottle page, and topic experts i.e. people pinned to the Breeze water bottle page. The similar products are obtained by querying the knowledge graph using the type product and selecting resulting topics which are represented by nodes that are proximate to the Breeze water bottle node in the knowledge graph. The items the other people also search for are obtained from query logs of the knowledge graph. The topic experts are obtained from the properties of the Breeze water bottle topic node in the knowledge graph. In this way the knowledge graph, with topic types, is particularly easy and efficient to search. The query suggestions are obtained in an efficient manner from the knowledge graph using the topic type of the page. As a result of the query suggestions the user has fewer actions to make as compared with entering a query from scratch, since the user is able to select one of the query suggestions using a single user action rather than having to type in the query.

Figure 5:
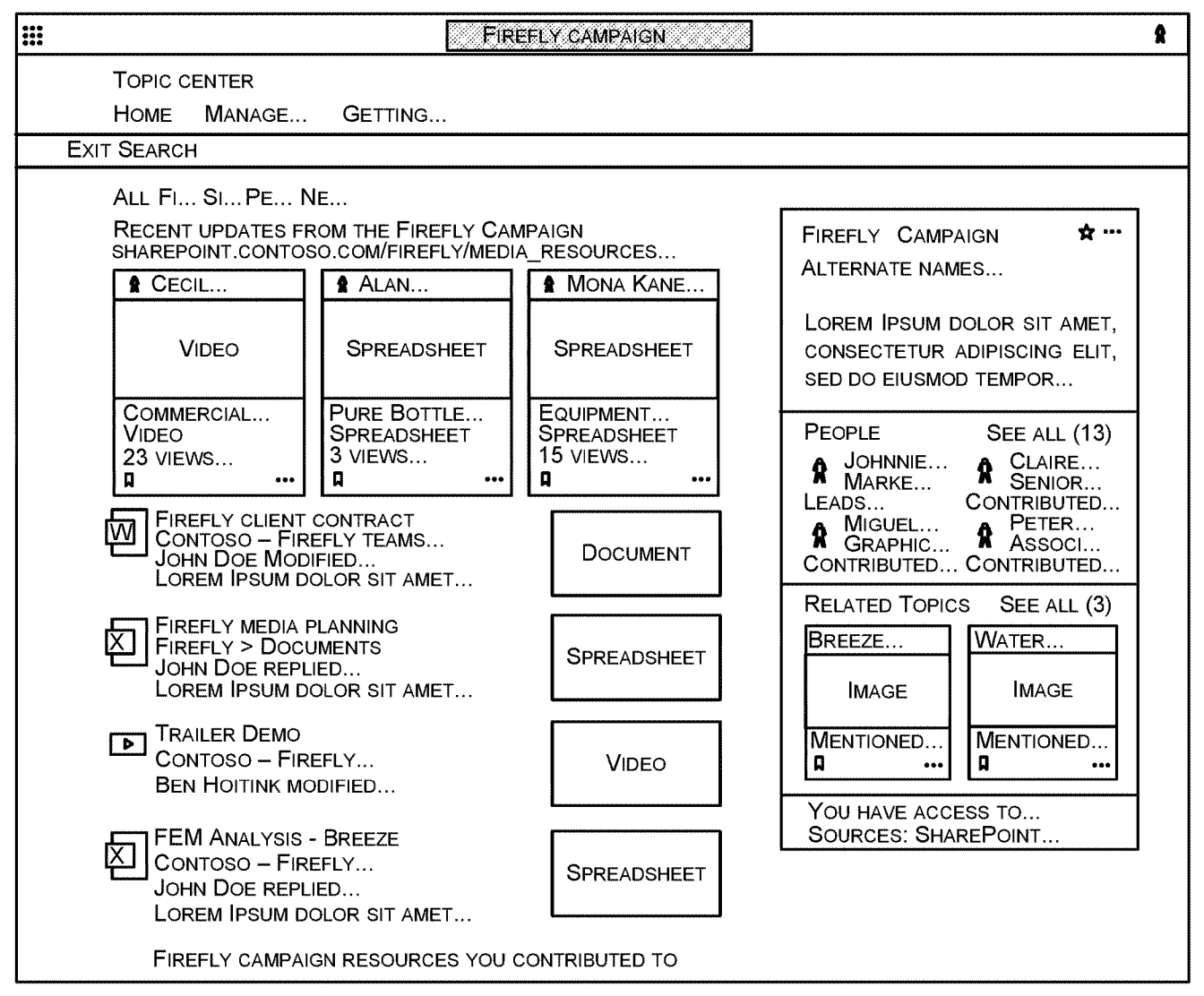

FIG. 5 is a schematic diagram of a results page obtained by searching the knowledge base for a specified topic. In the example of FIG. 5 a user has entered the query "Firefly campaign" into the search query box at the top of the topic center page or has spoken a query to a conversational assistant such as by saying "I want to find resources from the Firefly campaign" or "I want to find people who are working on the Firefly campaign". The query is sent to the knowledge base which returns search results which are displayed as follows. On the right hand side there is a pane that presents knowledge about the Firefly campaign in the structured format. On the left hand side there are previews of recent updates from the Firefly campaign including information about a video and information about two spreadsheets relevant to the campaign. Information about resources related to the topic is given at the bottom left including for two text documents, a video and a spreadsheet. The information includes thumbnail images and text. In FIG. 5, the user enters a query comprising a specified topic, "Firefly" as well as a type of the topic i.e. "campaign". Because both the topic and the topic type are given in the query it is possible to search extremely efficiently to find relevant entries of the knowledge graph.

As mentioned above, a node in the knowledge graph can have more than one topic type label. Each topic type label has an associated probability expressing a likelihood that the topic type label is appropriate for the node. In an example, labelling one of the plurality of nodes comprises labelling the node with labels denoting more than one topic type and storing, for each topic type, a probability that the topic type applies to the node, wherein the probability is computed from a topic type correctness model described later in this document. It is possible to search the knowledge base for one or more of the nodes and to selecting one or more of the topic types of the nodes found in the search for display to a user on the basis of the probabilities.

Figure 6:
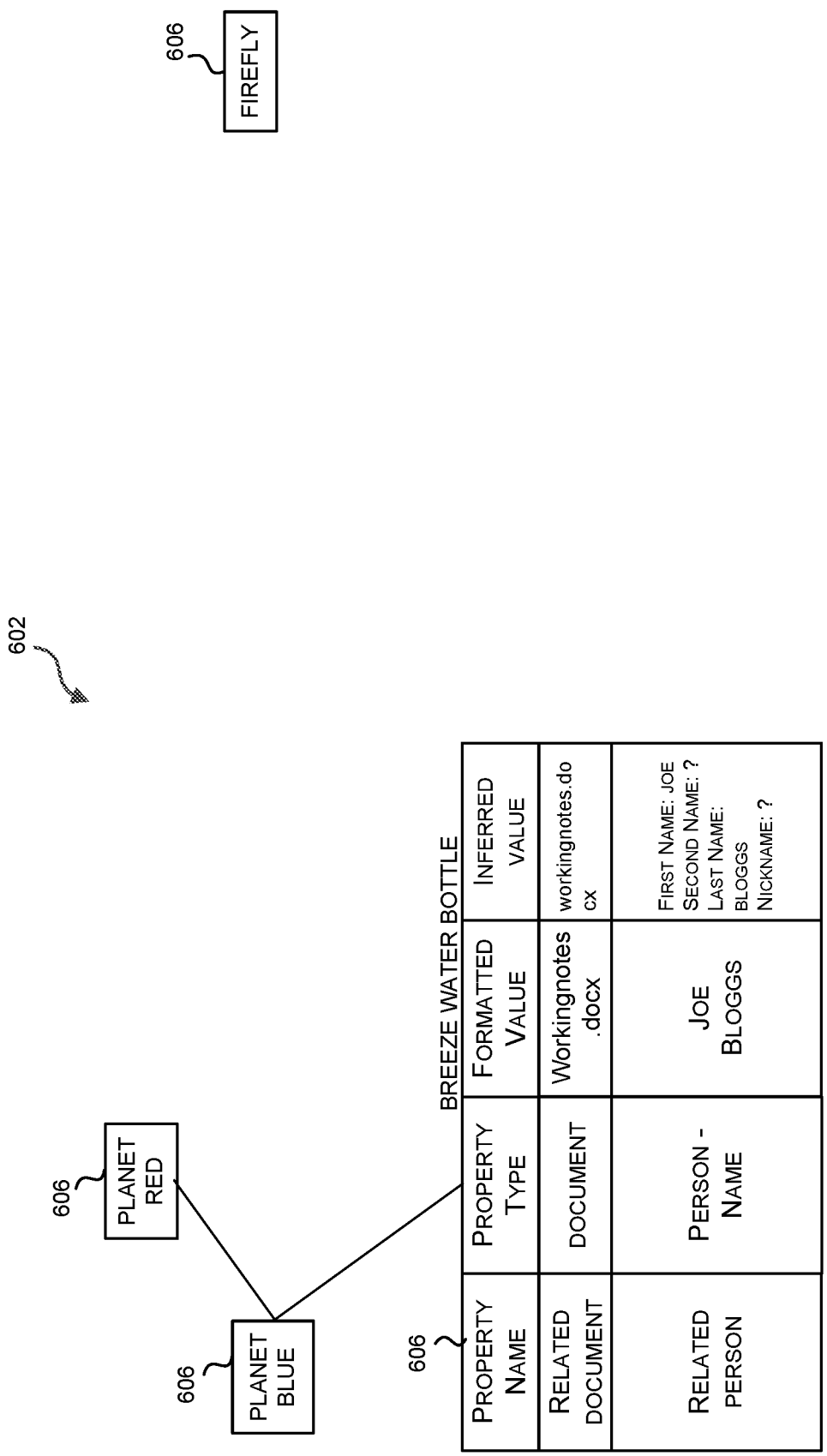
FIG. 6 is a schematic diagram of part of a knowledge base before topic type labels are applied.

FIG. 6 is a schematic diagram of part of the probabilistic knowledge base 100 of FIG. 1 before topic types are available. The knowledge base 100 comprises a plurality of topic types of which only three are shown in FIG. 6 although in practice there are thousands of topic types. In the example of FIG. 6 the topic types are PRODUCT 600, EVENT 602, and CAMPAIGN 604.

Each topic type has one or more uncertain topics. In the example of FIG. 6 the topic type PRODUCT 600 has three topics 606 A Breeze water bottle, B and C, the topic type EVENT 602 has no topics, and the topic type CAMPAIGN 604 has one topic FIREFLY. Topic A of the PRODUCT 600 topic type is illustrated in more detail in FIG. 6 whereas the other topics 206 are illustrated in collapsed schematic form for clarity. Each topic has one or more properties where a property is a characteristic of a topic which takes an uncertain value. Each property has a type from the type library which has one or more associated formats to convert a property value of the type into a formatted version of the property value, such as text or other formatted data. In the example of FIG. 2, Entity A of the PERSON 200 entity type comprises two properties which in this example are "date of birth" and "name". The property "date of birth" has the property type "date" and takes the value "August 1961". Uncertainty data is stored in the knowledge base as indicated in the inferred value column of the table in FIG. 2. In the case of the property name "date of birth" the day is uncertain and is represented by a question mark. The month is inferred as "August" and the year is inferred as "1961". The property types are parameterized in some examples as explained in more detail below. Together the properties and types of the properties of an entity type are referred to as a schema of the entity type; all the entities of a given entity type have the same schema. Thus a schema is part of a definition of an entity type. Other parts of the definition include a name, an optional description, an icon, an owner and optional other parts.

In the example of FIG. 2 the entity A has a second property which is "name" and this property has the type "person name" and the value "Joe Bloggs". There is uncertainty about the second name and nickname as indicated by the question marks in the inferred value column of the table in FIG. 2.

In the example of FIG. 2 the entity A has only two properties although there may be one or more properties. The two properties form part of the schema of entity type PERSON 200 in the example of FIG. 2.

The values of the properties in FIG. 2 for entity A of the PERSON entity type are incomplete although in some cases these will be complete. Thus incomplete values of properties are present (such as a year of birth rather than a full date of birth) or missing values of properties are present. The task of the knowledge base construction and/or maintenance system 102 is to add more entity types, entities, properties, or templates to the knowledge base and/or to update existing data in the knowledge base. It does this by using the observations to carry out inference and update probability distributions of the variables of the probabilistic generative model. Templates are text or other formatted data with placeholders to insert formatted values of properties of an entity (an entity is an instance of an entity type, and is also referred to herein as an entity value). There are typically many templates per entity type, and these may be represented as a distribution over string values, or may be enumerated into a list. Templates combine the formatted property value into text or other formatted data.

FIG. 6 is a schematic diagram of part of the probabilistic knowledge base 100 of FIG. 1 before topic types are available. There are four topics each represented by a node 606. The four topics are Planet Red, Planet Blue, Breeze Water Bottle and Firefly. The Breeze Water Bottle topic is shown expanded so the properties are visible and the other topics are collapsed for clarity.

Each topic has one or more properties where a property is a characteristic of a topic which takes an uncertain value. In the example of FIG. 2, topic Breeze Water Bottle comprises two properties which in this example are "related document" and "related person". The property "related document" has the property type "document" and takes the value "workingnotes.docx". Uncertainty data is stored in the knowledge base as indicated in the inferred value column of the table in FIG. 2. In the case of the property name "related person" the second name is uncertain and is represented by a question mark as is the nickname. The properties of a topic are part of a schema of the topic; all topics have the same schema. Thus a schema is a definition of a topic.

In the example of FIG. 2 the Breeze Water Bottle topic has only two properties although there may be one or more properties.

A task of the knowledge base construction system 102 is to add more topics, properties, or templates to the knowledge base and/or to update existing data in the knowledge base. It does this by using the observations to carry out inference and update probability distributions of the variables of the probabilistic generative model. Templates are text or other formatted data with placeholders to insert formatted values of properties of a topic.

Another task of the knowledge base construction system 102 is to learn topic types and to label nodes of the knowledge graph using the learnt topic types. In some examples labelling the nodes comprises updating the schema to include a topic type property so that each node has a topic type property field in it's schema which is populated with information as explained below with reference to FIG. 9.

Figure 7:
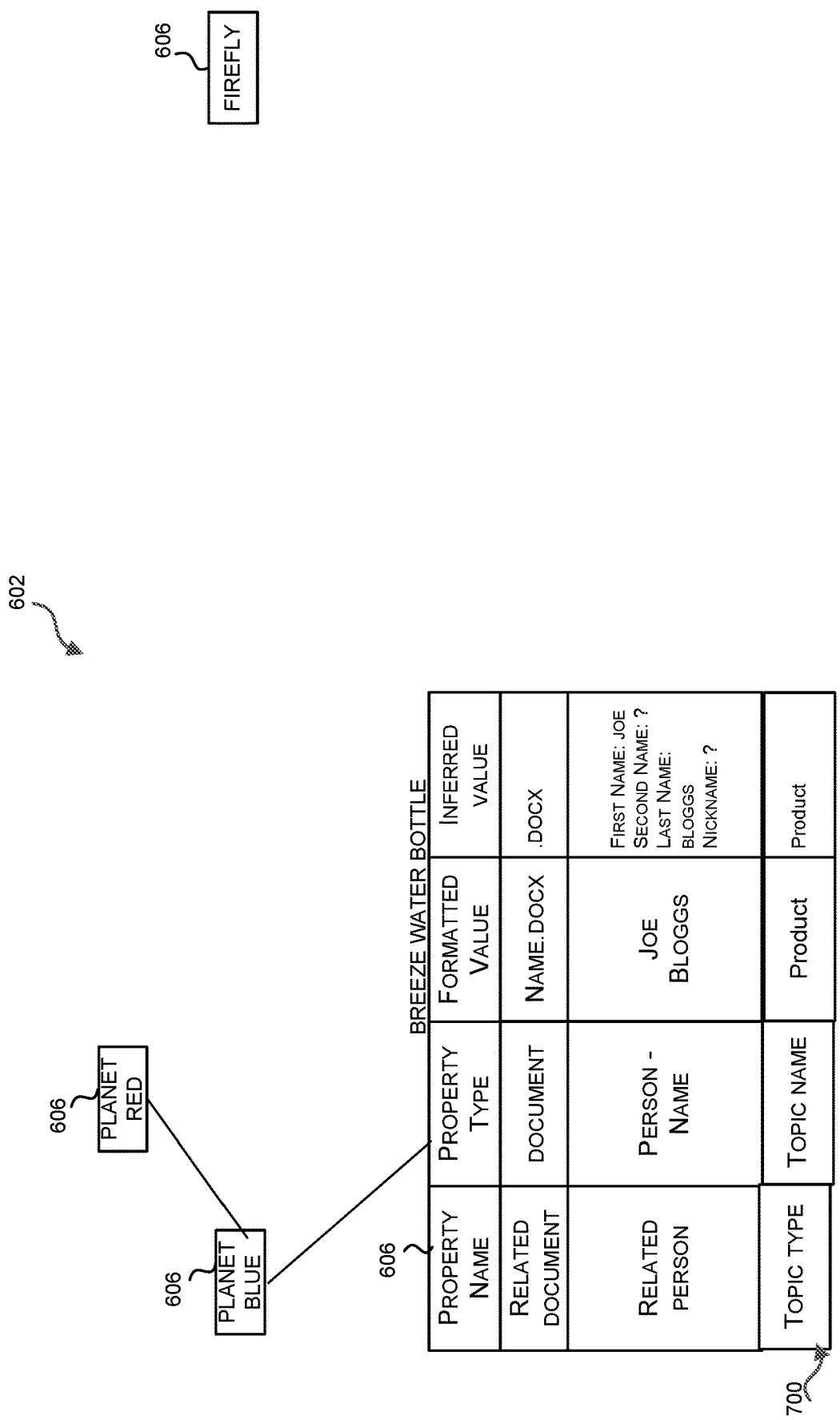
FIG. 7 is a schematic diagram of the part of the knowledge base after topic type labels are applied.

FIG. 7 is a schematic diagram of part of the probabilistic knowledge base 100 of FIG. 1 after topic types have been added. The topic type for topic Breeze Water Bottle is Product and is recorded in the schema of the topic as indicated at row 700. More detail about how topic types are learnt and about how they are populated in the knowledge base is now given with reference to FIGS. 8 and 9.

Figure 8:
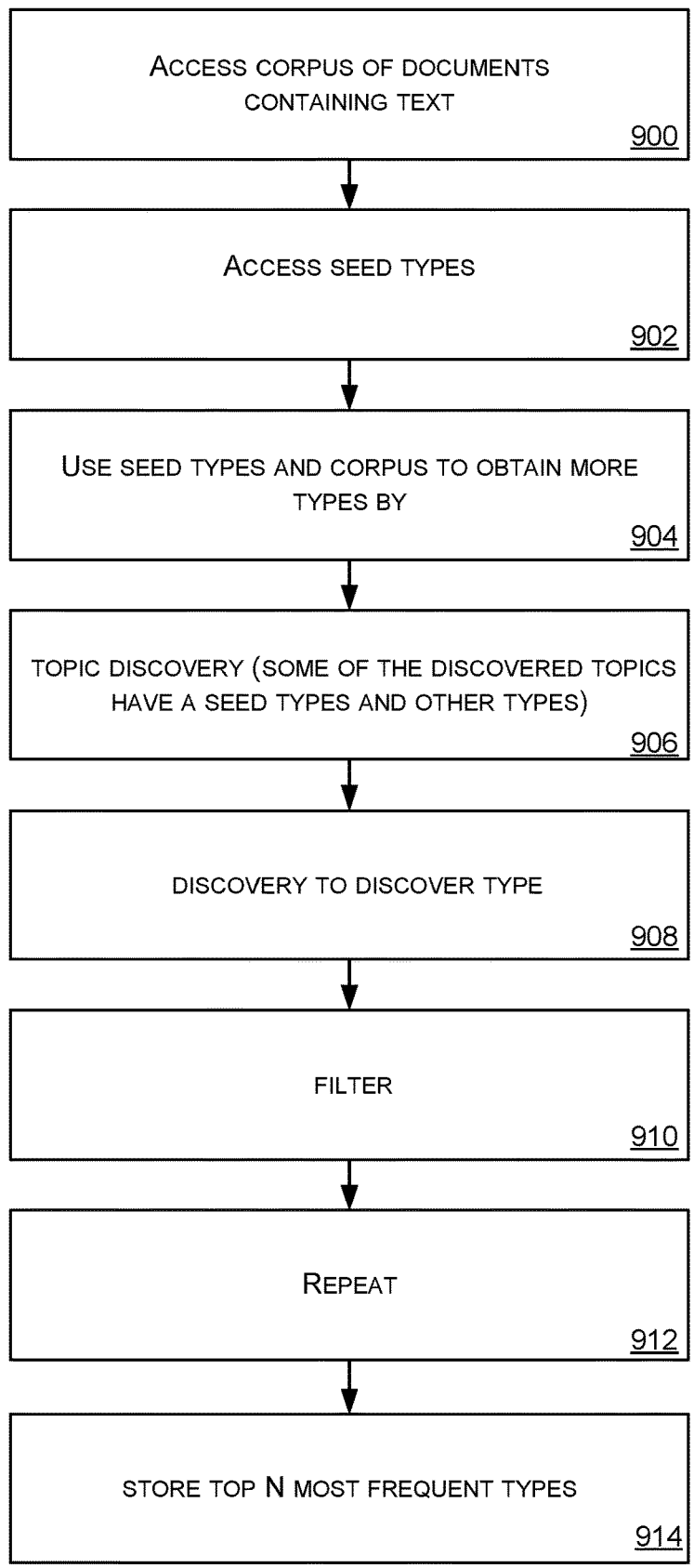
FIG. 8 is a flow diagram of a method of computing topic types from text documents.

FIG. 8 is a flow diagram of a method performed by the topic type discovery component 110 of FIG. 1. A corpus of documents is accessed 900 such as documents owned by a particular enterprise which will be using the knowledge base. The documents in the corpus contain text where the text has at least some mentions of topics and topic types. The number of documents in the corpus is large such as several thousand. A non-exhaustive list of examples of text document is: email, blog post, report, product plan, schedule.

The topic type discovery component 110 has access 902 to a plurality of seed types such as two or more seed types. Each seed type is a topic type together with one or more examples of topics of the topic type. The seed types are manually obtained.

The topic type discovery component 110 uses 904 the seed types and the corpus to obtain 904 more types as now explained.

The knowledge base construction system is used to carry out topic discovery 906 on the corpus of documents. Topic discovery is an automated computational task. Topic discovery comprises using a statistical model of text mentioning a topic and searching the corpus to find text which meets criteria of the statistical model. The statistical model is an extension of a statistical model of a generic person's name so that the statistical model is able to find topics such as projects, platforms and services and is not focused only on people. Carrying out topic discovery on the corpus of document is a computationally intensive task. In order to reduce the amount of computation the seed topic types are used. Since a topic has more than one topic type in many cases, then where topics of a seed type are found in the corpus, these potentially also have other unknown types which are then identifiable using templates as explained below. By searching the corpus for mentions of topics known to be of a seed type it is possible to reduce the computation burden.

Once mentions of topics have been identified in operation 906 the process involves identifying candidate topic types of the identified topic mentions. The process has one or more templates. A template is a sequence of words, in this case containing the given topic and a placeholder for a topic type. Examples of templates are:
   {Name} {Types} team
   {Name} is a {Types}
   {Name} is an {Types}

There are many hundreds or thousands of templates which have been learnt by the knowledge base construction apparatus 102 using the probabilistic generative model 104, inference algorithm 108, inference component 109 and compiler 107. The collection of templates is an internal representation of a language model describing how people wrote about topics in text. In some examples a deep language model (deep neural network language model) is used as the language model so that templates are not needed.

The topic type discovery component 110 searches text at each of the topic mentions. It searches the text by placing a template onto the text so that the placeholder for the topic lies over the topic mention. It checks whether the words in the template match the corresponding words in the text underneath the template. If there is a match the word(s) underlying the placeholder for the topic type are stored as candidate topic types.

Many hundreds or thousands of candidate topic types are stored and are then filtered 910 by ranking the candidate topic types according to frequency and retaining only the top n candidate topic types which are most frequent.

The topic type discovery component 110 repeats 912 the process from operation 900 using either the same corpus of documents or a different corpus of documents. The top n most frequently occurring topic types are stored 914 since these are likely to be true topic types. In an example, several hundred topic types are stored. The topic types are stored in a list. In some cases the list is formed into a hierarchy according to subtypes. For example, the Event type includes subtypes Conference, Workshop, Summit.

The knowledge base construction apparatus 102 uses the topic type list or hierarchy 1002 to update the knowledge graph 1000.

Figure 9:
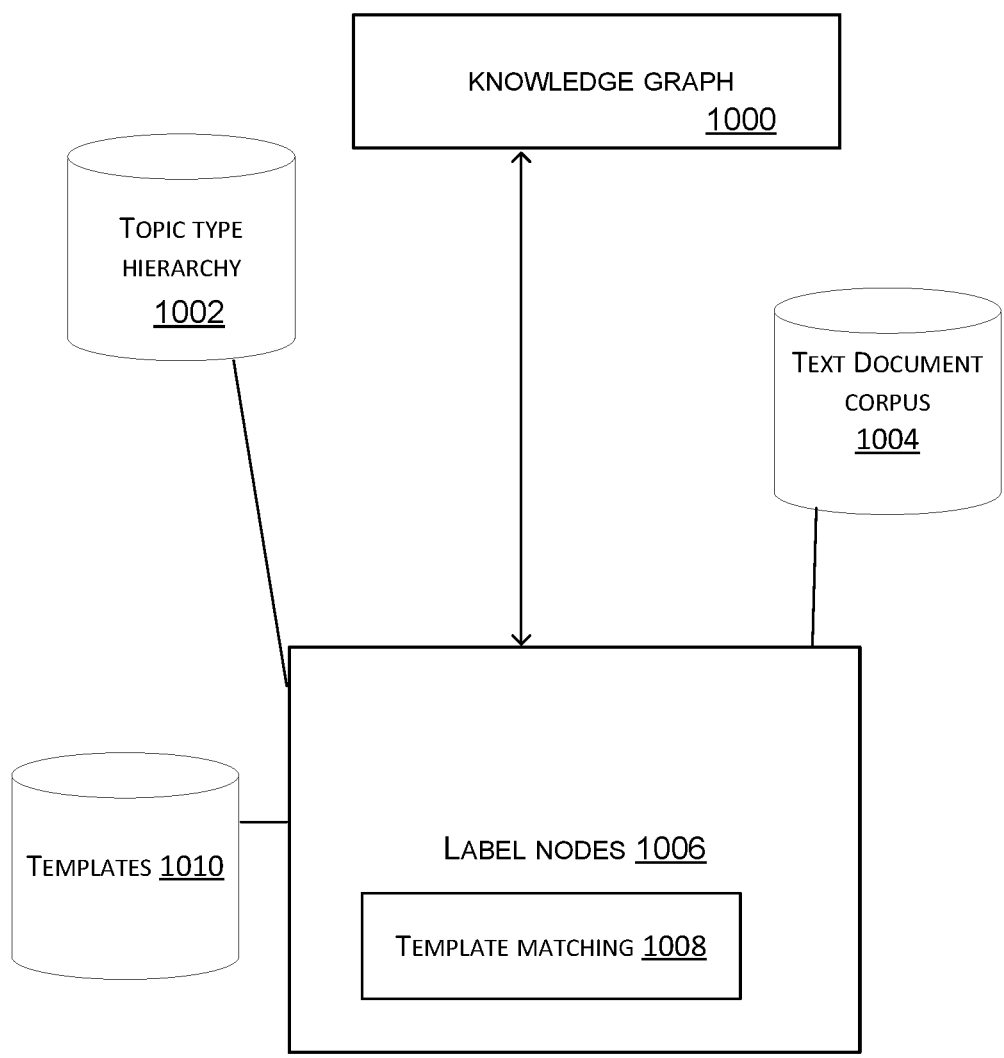
FIG. 9 is a flow diagram of labelling nodes in a knowledge base with topic type labels.

FIG. 9 shows the knowledge graph connected to a component for labelling nodes 1006. In some examples the component for labelling nodes 1006 is a deep language model comprising a neural network which has been trained to classify text using the topic type labels in the topic type hierarchy. Any suitable conventional deep language model is used.

In some examples the component for labelling nodes 1006 uses templates as now explained. The component for labelling nodes 1006 has access to the topic type hierarchy 1002 or list as well as to the templates 1010 used at operation 908 of FIG. 8. The component for labelling nodes 1006 accesses a corpus of text documents 1004 which are recent documents from an enterprise which is using the knowledge base, or any other text documents. Template matching is done. For example, for an individual one of the nodes of the knowledge graph representing a given topic, the template matching process 1008 comprises searching the accessed text documents for matches to at least one template, the template being a sequence of words and containing the given topic and a placeholder for a topic type. When a match is found the contents of the placeholder are stored as a candidate. When a threshold number of candidate topic types are found which are the same for the given topic, the associated topic node in the knowledge graph is labelled with the identified topic type. The labelling comprises storing the topic type in a schema of the topic. Probability data is also stored to indicate a confidence that the topic type has been automatically inferred correctly. The confidence value is computed from a topic type correctness model as described below. A given topic has more than one topic type in many cases, with each topic type having an associated probability value. That is, a given topic may have a probability x of being of topic type A, a probability y of being of topic type B, a probability z of being of topic type Z and so on. In an example, labelling one of the plurality of nodes of the knowledge graph with a label denoting a topic type also comprises storing a probability that the topic type applies to the node, wherein the probability is computed from a topic type correctness model.

The topic type discovery component of the disclosure operates in an unconventional manner to achieve automated discovery of topic types of the disclosure.

The knowledge graph is updated to add topic type labels to topic nodes and this improves the functioning of the underlying computing device since it is possible to query for topic types in an efficient manner.

In order to query the knowledge graph, after it has been modified to add topic types, there are various methods.

In an example the knowledge graph receives a query comprising a topic, searches the knowledge graph to identify nodes representing topics similar to the query, outputs a topic of at least one of the identified nodes, and outputting a topic type of the at least one identified node. FIG. 3 shows a topic card which is retrieved by search for the topic Firefly. The search result comprises the topic card which includes related topics and also includes the topic type (i.e. campaign).

In an example it is possible to filter by topic type. A selection of a topic type is received from a user and the knowledge base filters the identified nodes to include only the identified nodes having the selected topic type. By filtering using topic type it is possible to efficiently remove irrelevant results.

In an example it is possible to query the knowledge graph by topic type. A query is received comprising a topic type, the knowledge graph is searched to identify nodes having topic type labels corresponding to the topic type of the query, and the process outputs topics of the identified nodes.

In an example it is possible to find related topics. The method comprises receiving a query comprising a topic, searching the knowledge graph to identify nodes within a specified number of hops away from a node representing the topic of the query, outputting a topic of at least one of the identified nodes and outputting a topic type of the at least one identified node. A hop is a distance between a node and a neighboring node in the knowledge graph.

In an example it is possible to find related topics and filter by topic type. The method above is extended to comprise filtering the identified nodes to include only the identified nodes having a same topic type as a topic type of the query topic, and outputting the topics of the filtered identified nodes.

More detail about the probabilistic generative model is now given. The probabilistic generative model 104 is a process which generates text or other formatted data items from the knowledge base where the knowledge base comprises at least an one topic which has properties according to a schema and where formatted values of the properties of the topic are inserted into a template to form the text or formatted data item. The probabilistic generative model 104 comprises three processes, a process 310 for generating a schema for a topic, a process for generating a probabilistic knowledge base, and a process for generating text or formatted data from knowledge base values. The process for generating a probabilistic knowledge base is essentially a process which generates facts which are values of properties of a topic, and this process involves retrieving topics from the data sources 116, 118, 120. The term "topic retrieval" is used to refer to running inference on the overall model to infer the properties of a topic given the text or other formatted data, the schema and a set of templates.

The probabilistic generative model comprises a generic topic schema comprising a plurality of property types, each property type comprising one or more formats to convert a property value to a formatted property value which is at least part of an instance of the text or other formatted data.

An example of a probabilistic program which generates a probabilistic knowledge base is now given. This is an example of part of the probabilistic generative model 104.

```
// Create set of entities (of the same type)
Entity[ ] entities = new Entity [entity Count];
// Loop over entities of this type
for (int j=0;j<entities.Length;j++) {
  // Loop over properties in the schema
  for (int i=0;i<props.Length;i++) {
    // Pick number of alts from geometric dist
    int numAlts = random Geometric(probAlt);
    object[ ] alts = new object[numAlts];
    // Loop over alternatives
    for(int k=0;k<alts.Length;k++) {
      // Choose a property value from the prior
      alts[k]=random props[i].Type.Prior;
    }
    // Set alternatives as the property value
    entities[j][i]=alts;
  }
}
```

The example probabilistic program immediately above generates a probabilistic knowledge base comprising a plurality of topics. Each topic has values for each property of the generic topic schema. For example, a topic of type "person" has a value for the "DateOfBirth" property.

The probabilistic generative model 104 also comprises a process for generating text or other formatted data items from values of the knowledge base 100. The process for converting typed values in the knowledge base into unstructured text is now described.

First, a topic to describe is selected 400 at random from the knowledge base 100.

Once a topic has been selected 400 a property of the topic is selected 402 and for the selected property a property type format prior is accessed 404. The property value of the selected property is converted 406 into a string value using a format drawn from the type-specific format prior. For example, the date Jul. 6, 1946 is converted into the string "July 1946" using the format "MMMM yyyy" where that format has been drawn from the type-specific format prior. If there are more properties of the entity the process repeats. Once there are no further properties the next task is to embed the computed string property values into a natural sentence, or part of one. To do this, a template is selected 410. An example template, is "{name} was born on {date_of_birth} in {place_of_birth}". The template is selected 410 at random from a provided set of templates (the templates are learnt as described later in this document). These templates are drawn from a suitable prior over strings that enforces that braces occur at word boundaries. The template is filled 412 by replacing each property placeholder with the corresponding value string. Finally, suitable prefix and suffix strings (obtained from observations 114) are concatenated 414, allowing the completed template to appear inside a larger section of text. An example probabilistic program defining this process is now given.

```
// Pick an entity to talk about at random
Entity entity=random Uniform(entities);
// Loop over properties of that entity
for (int i=0;i<props.Length;i++) {
  // Pick a format from type-specific prior
  var format=random props[i].Type.FormatPrior;
  // Pick an alternative value to use
    var alt=random Uniform(entity[i]);
  // Use format to convert value into string
    propStr[i]=alt.ToString(format);
}
// Pick template e.g. "{name} was born on {DoB}"
string template=random Uniform(templates);
// Fill in template, using the string values
string s=string.Format(template, propStr);
// Add text either side to complete the extract
string text=Prefix( )+s+Suffix( );
```

In examples, the knowledge base construction apparatus 102 generates entire data items, such as emails or calendar events, using specified structured templates. In an example, a latent knowledge base topic has three properties, Name, Types and Members. The property "Name" has the value "Tokyo". The property "Types" has the values "Project, System" and the property "Members" has the values "Alice", "Bob", "John". A structured template is available in memory such as a structured template called CalendarEvent which has four fields: Name, Organizers, Attendees, IsRecurring. The name field is filled according to the following criteria "{Name} {Types} sync", the Organizers field is filled according to the criteria Subset (Members), the Attendees field is filled according to the criteria Subset (Members), the IsRecurring field is filled with the value True. When the latent knowledge base entity and CalendarEvent template are combined the result is a generated data item which is a calendar event with the Name field populated by "Tokyo project sync", the Organizers field populated by "John", the Attendees field populated by "Alice, Bob" and the IsRecurring field populated by the value True.

In this example, the structured template is applied to a Project topic named "Tokyo" to create a recurring calendar event 'Tokyo project sync' with suitable organizers and attendees. During inference this process is inverted, so a compatible calendar event is matched against this structured template to produce the knowledge base entity. A structured template consists of the type or types of data items which can be generated (such as emails, calendar events or documents) along with a set of properties for the generated data items each with a suitable value generator. Value generators are one of three kinds: (i) A template-based generator which generates a string given a template. If more than one template is provided, one is selected at random. The Name property in the Tokyo example uses this kind of value generator. (When 'Types' is used in a template, one type is selected at random.) (ii) A subset generator which generates a collection value as a random subset of a specified collection in the topic.

The Organizers and Attendees property in the Tokyo example use this kind of generator to generate subsets of the Members property. (iii) A constant value generator which always gives a particular value. The IsRecurring property in the Tokyo example uses a constant value generator which always returns 'True'.

In one approach, the prior probability of a topic name is uniform over a set of valid names. A more sophisticated model takes into account the number of words, the length of each word, and more. This means that two mentions of the same long name are less likely to be a random collision and more likely to be referring to the same topic than two mentions of the same short name. This improves the ability of the system to disambiguate mentions of different topics sharing the same name.

In enterprise data, it is common for a topic to be referred to by different variations of a name, such as abbreviated forms, capitalizations, etc. Various examples of the present disclosure allow a topic to have alternative names, as long as the alternatives are compatible variants of each other under a set of variants models. The supported variants models are:

Case and diacritic variants where names differ in case or in the presence/absence of accents or diacritics;

Separator variants where the names differ in separators (such as '&' or '+') or the separators are removed entirely;

Name phrase variants where a name "Tokyo" and a name phrase "Project Tokyo" are identified;

Acronym variants where one name is an expansion and the other an acronym or partial acronym.

When computing the probability that two mentions refer to the same topic, if their names do not match but are compatible alternatives, then the probability is the same as if the names matched (on the more probable name), times a constant penalty.

As explained with reference to FIGS. 6 and 7, facts about a topic are represented by named, typed properties. A property named 'Types' holds the types for the topic, selected from a predefined set. The knowledge base construction system learns this set of allowed types through a process of type discovery as explained above with reference to FIG. 8. In an example, type discover starts with a small manually-provided seed set of types, such as {Project, Team}. New types are then added iteratively as follows: (i) Topic discovery is run to extract topics from a set of enterprise data items, given these seed types. (ii) Fact retrieval is run using the names of these discovered topics. The schema is modified to allow values of the Types property to be any string of 1-3 words, rather than one of the fixed set of known types. The resulting type names are 'type candidates'. (iii) The type candidates are aggregated across entities and automatically filtered based on their frequency and other checks, such as whether there is uncertainty in the posterior distribution over the type name. (iv) The remaining type names are filtered to exclude people types and file types. (v) The approved types are added to the type set and the process is repeated using this updated set. Iteration continues until the number of newly added types becomes sufficiently small to ensure that good overall coverage has been achieved.

This type discovery process works because topics usually have multiple types. For example, 'Tokyo' might be referred to as a project but also as a framework, system and toolkit.

Each iteration of type discovery first finds entities whose types are any known type and then uses fact retrieval to add in the other types for these topics, which may be unknown. Iteration of this process will discover any type, so long as there exists a chain of topics which connect that type to a seed type. In practice, given a large set of enterprise data, the process appears to give good coverage of types across a wide variety of domains.

In some examples, incremental clustering is used to improve scalability as now explained.

Typically new documents appear, or are updated, at different times and their overall volume exceeds the capacity of a single machine. Therefore, the knowledge base construction system is designed to process documents incrementally and update the knowledge base in an online fashion.

In detail, let the set of documents available at time t be Dt. Given a set of templates J, the template matching process described above is used to produce a set of template matches {Sj,t} for Dt. These template matches are split into I batches 1; ::::; I of arbitrary size so that Sj;i;t is the i-th batch available at time t from the template set J. For simplicity of notation, a single time interval is described here, as it trivially generalizes to any time interval, and so t is dropped from the variables in the following explanation.

Batch clustering: The knowledge base construction system takes {Sj;i} as observations and applies probabilistic inference to produce a set of discovered topics Ei. For example, a document D1 titled "Project Tokyo overview" authored by Alice and a calendar event D2: "Tokyo team weekly sync" organized by Bob are matched by structured templates containing the text templates "{Types} {Name} overview" and "{Name} {Types} weekly sync", respectively. Given these matches, batch clustering will output a topic {Name: Tokyo, Types: {Project, Team}, Members: {Alice, Bob}, Evidences: {D1, D2}}.

Linking: In an example, the topics discovered from the batch are linked to the knowledge base by the following steps:

Query the knowledge base for candidate entities Qi, using a set of key properties, such as the topic name. To allow for name variants, the queries are extended to include different normalized forms of the topic names. For example, a topic with a name "Cloud Storage Explorer" is queryable by "cloudstorageexplorer" and "CSE" keys which allows it to cluster incrementally with entities named "CloudStorage Explorer" and "CSExplorer" whose normalized names will overlap.

ii Produce a set of entities Ri by clustering together Ei, Qi, iii Update the knowledge base by replacing the entities Qi with the result set Ri which contains both new and updated entities. For example, if the knowledge base contains an entity: "{Names: Tokyo, Types: {Project}, Members: {John}, Evidences: {D3}}", the linking step will conflate it with the topic produced from the batch clustering step and so create an updated entity "{Name: Tokyo, Types: {Project, Team}, Members: {Alice, Bob, John}, Evidences {D1, D2, D3}}".

Curation: During this optional process, a human curator optionally asynchronously edits the knowledge base and/or adds new topics. Both the artificial intelligence mined and curated entities are included in Qi allowing mined and curated entities to be linked together into coherent merged entities. The batch size can be adjusted based on the memory constraints of the executor—a small batch size requires less memory but increases the runtime for processing all the batches. A benefit is that users are able to contribute to topic discovery and topic type discovery in a simple, efficient manner.

Entity Correctness: In one approach fact retrieval is performed for known topics which restricts the set of valid names for template matching. In various examples described herein the embodiments aim instead to discover topics and so template matching is unrestricted. This results in the knowledge base construction system discovering topics which are unwanted, such as people, months, locations, document names and tiny entities which are mentioned only in passing. To address this problem, a 'topic correctness' model is trained on a small sample of manually labeled topics, using simple features like the number of documents mined from, the kinds of documents, the template diversity and so on, that can be applied post-linking to estimate the correctness of each topic. In a particular example the classifier was trained on a sample of manually labelled 857 topics (274 positive and 583 negative labels).

Where embodiments discover topic types, template matching is unrestricted. This results in the knowledge base construction system discovering topic types which are unwanted, such as tiny topic types which are mentioned only in passing. To address this problem a topic type correctness model is trained on a small sample of manually labeled topic types, using features such as one or more of: the number of documents mined from, the kinds of documents, the template diversity. The topic type correctness model is applied to estimate the correctness of each topic type. The topic type correctness model takes as input a candidate topic type and outputs a probability value indicating a likelihood of the candidate topic type being a correct topic type.

The scalability of the knowledge base construction was tested empirically and found to be graceful. In an experiment the knowledge base construction system was able to process 1; 023; 435 documents and 45; 645; 618 template matches in 9.3 h on a conventional machine, using 8.64 GB of memory measured as the median of the last 50 batches (Memory@50). It discovered 675; 439 entities and 172 entity types. The clustering time was constant across batches, taking approximately 23 seconds for a batch of 10,000 template matches. The linking time increased approximatively linearly with a small slope (0.005) over batches as the size of the knowledge base grows over time (that is mitigated by cleaning up old entities). Overall, this result shows that the incremental clustering architecture adopted in the knowledge base construction system scales gracefully on a large dataset.

The performance of the knowledge base construction system, in embodiments where it uses a template-based language model and does not comprise a neural language model, was tested and compared with alternative approaches which do use neural language models. The well-known Enron data set was used which is a corpus of 517,401 emails generated by 150 employees of the Enron Corporation. The knowledge base construction system used a set of 88 templates and a hierarchy of 176 topic types. The knowledge base construction system was found to have the highest precision of all the approaches tested, where precision is a measure of the proportion of discovered topic names with a positive label out of all the topics that can be matched to the ground truth. The knowledge base construction system was found to retrieve more topic types than the other approaches. The knowledge base construction system was able to associate up to 9.5 times more topic types to the discovered topics compared to the other approaches.

Figure 10:
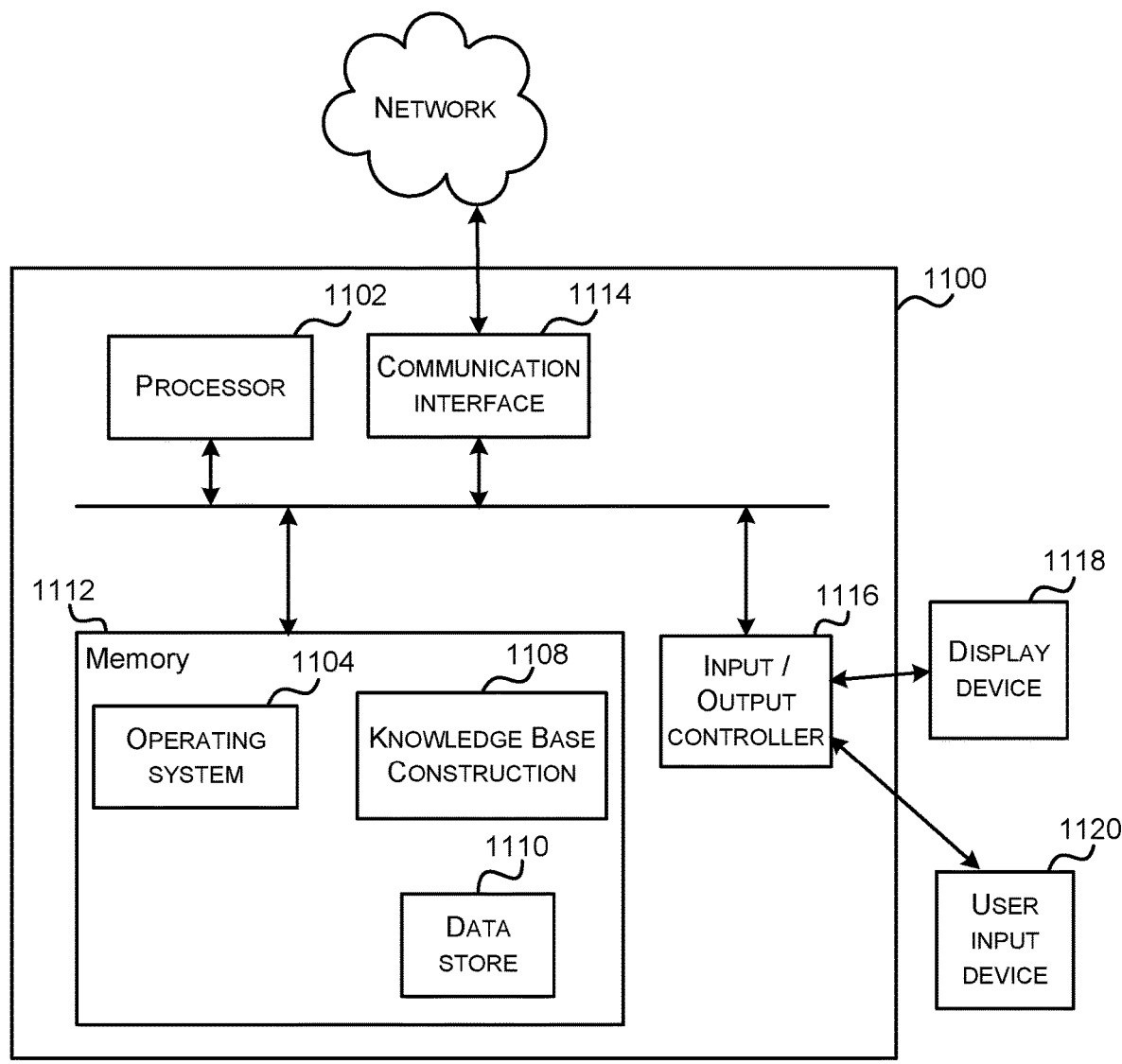
FIG. 10 illustrates an exemplary computing-based device in which embodiments of a knowledge base construction apparatus are implemented.

FIG. 10 illustrates various components of an exemplary computing-based device 1100 which are implemented as any form of a computing and/or electronic device, and in which embodiments of a knowledge base construction apparatus are implemented in some examples.

Computing-based device 1100 comprises one or more processors 1102 which are microprocessors, controllers or any other suitable type of processors for processing computer executable instructions to control the operation of the device in order to implement the method of any of FIGS. 8 and 9 and/or to query a knowledge base having topics labelled with topic types. In some examples, for example where a system on a chip architecture is used, the processors 1102 include one or more fixed function blocks (also referred to as accelerators) which implement a part of the method of any of FIGS. 8 and 9 or querying of the knowledge base in hardware (rather than software or firmware). Platform software comprising an operating system 1104 or any other suitable platform software is provided at the computing-based device to enable application software to be executed on the device. A knowledge base construction component 1108 is stored in memory 1112. Data store 1110 stores topics, topic types, topic type hierarchies and other data.

The computer executable instructions are provided using any computer-readable media that is accessible by computing based device 1100. Computer-readable media includes, for example, computer storage media such as memory 1112 and communications media. Computer storage media, such as memory 1112, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1112) is shown within the computing-based device 1100 it will be appreciated that the storage is, in some examples, distributed or located remotely and accessed via a network or other communication link (e.g., using communication interface 1114).

The computing-based device 1100 also comprises an input/output controller 1116 arranged to output display information to a display device 1118 which may be separate from or integral to the computing-based device 1100. The display information may provide a graphical user interface to display results pages and other user interface displays such as those illustrated in FIGS. 2 to 5. The input/output controller 1116 is also arranged to receive and process input from one or more devices, such as a user input device 1120 (e.g., a mouse, keyboard, camera, microphone or other sensor). In some examples the user input device 1120 detects voice input, user gestures or other user actions. In an embodiment the display device 1118 also acts as the user input device 1120 if it is a touch sensitive display device. The input/output controller 1116 outputs data to devices other than the display device in some examples, e.g., a locally connected printing device.

Alternatively, or in addition to the other examples described herein, examples include any combination of the following:

Clause A. A computer-implemented method of database construction comprising:
   storing a knowledge graph comprising nodes connected by edges, each node representing a topic;
   accessing a topic type hierarchy comprising a plurality of types of topics, the topic type hierarchy having been computed from a corpus of text documents;
   accessing one or more text documents;
   labelling a plurality of the nodes with one or more labels, each label denoting a topic type from the topic type hierarchy, by,
      using a deep language model; or
      for an individual one of the nodes representing a given topic,
         searching the accessed text documents for matches to at least one template, the template being a sequence of words and containing the given topic and a placeholder for a topic type; and
   storing the knowledge graph comprising the plurality of labelled nodes.

Clause B. The method of clause A comprising receiving a query comprising a topic, searching the knowledge graph to identify nodes representing topics similar to the query, outputting a topic of at least one of the identified nodes, and outputting a topic type of the at least one identified node.

Clause C. The method of clause B comprising receiving a selection of a topic type and filtering the identified nodes to include only the identified nodes having the selected topic type.

Clause D. The method of any preceding clause comprising receiving a query comprising a topic type, searching the knowledge graph to identify nodes having topic type labels corresponding to the topic type of the query, outputting topics of the identified nodes.

Clause E. The method of any preceding clause comprising receiving a query comprising a topic, searching the knowledge graph to identify nodes within a specified number of hops away from a node representing the topic of the query, outputting a topic of at least one of the identified nodes and outputting a topic type of the at least one identified node.

Clause F. The method of clause E comprising filtering the identified nodes to include only the identified nodes having a same topic type as a topic type of the query topic, and outputting the topics of the filtered identified nodes.

Clause G. The method of any preceding clause comprising computing the types of the topic type hierarchy from a corpus of text documents and using a plurality of seed types.

Clause H. The method of clause G comprising: searching for topics in the corpus of text documents to identify topics having one of the seed types.

Clause I. The method of clause H comprising: for each identified topic, searching text near to the identified topic for matches to the at least one template, and when a template match is found which fills the placeholder for topic type, outputting the contents of the placeholder as a candidate topic type.

Clause J. The method of clause I comprising filtering the candidate topic types to retain a specified number of most frequently occurring candidate topic types.

Clause K. The method of clause J comprising using the retained candidate topic types as seed types and repeating the process of searching for topics in the same corpus of text documents to identify topics having one of the seed types, and for each identified topic, searching text near to the identified topic for matches to the at least one template, and when a template match is found which fills the placeholder for topic type, outputting the contents of the placeholder as a candidate topic type.

Clause L. The method of clause J comprising using the retained candidate topic types as seed types and repeating the process of searching for topics in a different corpus of text documents to identify topics having one of the seed types, and for each identified topic, searching text near to the identified topic for matches to the at least one template, and when a template match is found which fills the placeholder for topic type, outputting the contents of the placeholder as a candidate topic type.

Clause M. The method of clause L wherein labelling one of the plurality of nodes comprises labelling the node with labels denoting more than one topic type and storing, for each topic type, a probability that the topic type applies to the node, wherein the probability is computed using a topic type correctness model.

Clause N. The method of clause M comprising searching the knowledge base for one or more of the nodes and selecting one or more of the topic types of the nodes found in the search for display to a user on the basis of the probabilities.

Clause O. A database construction apparatus comprising:
   at least one processor;
   a memory (712) storing instructions that, when executed by the at least one processor (714), perform a method for:
      storing a knowledge graph comprising nodes connected by edges, each node representing a topic;
      accessing a topic type hierarchy comprising a plurality of types of topics, the topic type hierarchy having been computed automatically from a corpus of text documents;
      accessing one or more text documents;
      labelling a plurality of the nodes with one or more labels, each label denoting a topic type from the topic type hierarchy, by,
         using a deep language model; or
         for an individual one of the nodes representing a given topic,
            searching the accessed text documents for matches to at least one template, the template being a sequence of words and containing the given topic and a placeholder for a topic type; and
      storing the knowledge graph comprising the plurality of labelled nodes.

Clause P. The database construction apparatus of clause O wherein accessing the one or more text documents comprises accessing document from the corpus.

Clause Q. The database construction apparatus of clause O or clause P wherein an individual one of the nodes has two or more labels.

Clause R. The database construction apparatus of any of clauses O to Q wherein the instructions are for receiving a query comprising a topic type, searching the knowledge graph to identify nodes having topic type labels corresponding to the topic type of the query, and outputting topics of the identified nodes.

Clause S. The database construction apparatus of any of clauses O to R wherein the instructions are for receiving a query comprising a topic, searching the knowledge graph to identify nodes within a specified number of hops away from a node representing the topic of the query, outputting a topic of at least one of the identified nodes and outputting a topic type of the at least one identified node.

Clause T. A database construction apparatus comprising:
at least one processor;
a memory (712) storing instructions that, when executed by the at least one processor (714), perform a method for:
storing a knowledge graph comprising nodes connected by edges, each node representing a topic and where a plurality of the nodes are labelled with labels denoting a topic type from a plurality of specified topic types;
wherein the nodes have been labelled, by,
using a deep language model; or
for an individual one of the nodes representing a given topic,
searching text documents for matches to at least one template, the template being a sequence of words and containing the given topic and a placeholder for a topic type of the plurality of specified topic types.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g., in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of database construction comprising:
accessing a topic type hierarchy from text documents, the topic type hierarchy comprising types of topics;
labelling a first node representing a topic with a first topic type and a second topic type from the topic type hierarchy, wherein labelling the first node comprises:
searching a text document for a match to at least one template, the template being a sequence of words and containing a stored topic and a placeholder for a stored topic type, wherein a template match fills the placeholder for the stored topic type such that contents of the filled placeholder comprise a candidate topic type;
receiving, for the first and second topic types, a probability that the topic type applies to the first node from a topic type correctness model that has as input the candidate topic type and has as output an estimate of a likelihood of the candidate topic type being a correct topic type; and
storing a knowledge graph comprising the labelled first node.

2. The method of claim 1 comprising receiving a query comprising a topic, searching the knowledge graph to identify a node representing a topic similar to the query, outputting a topic of the identified node, and outputting a topic type of the identified node.

3. The method of claim 1 comprising receiving a selection of a topic type and filtering identified nodes to include only identified nodes having a selected topic type.

4. The method of claim 1 comprising receiving a query comprising a topic type, searching the knowledge graph to identify a node having a topic type label corresponding to the topic type of the query, outputting a topic of the identified node.

5. The method of claim 1 comprising receiving a query comprising a topic, searching the knowledge graph to identify a node within a specified number of hops away from a node representing the topic of the query, outputting a topic of an identified node and outputting a topic type of the identified node.

6. The method of claim 1 comprising filtering identified nodes to include only identified nodes having a same topic type as a topic type of a received query topic, and outputting the topics of the filtered identified nodes.

7. The method of claim 1 comprising computing the types of the topic type hierarchy from a corpus of text documents and using a plurality of seed types.

8. The method of claim 7 comprising: searching for topics in the corpus of text documents to identify topics having one of the seed types.

9. The method of claim 1 comprising outputting the contents of the placeholder as the candidate topic type.

10. The method of claim 1 comprising filtering candidate topic types to retain a specified number of most frequently occurring candidate topic types.

11. The method of claim 10 comprising using the retained candidate topic types as seed types and repeating a process of searching for topics in a same corpus of text documents to identify topics having one of the seed types, and for each identified topic, searching text near to the identified topic for matches to the at least one template, and when a template match is found which fills the placeholder for topic type, outputting contents of the placeholder as the candidate topic type.

12. The method of claim 10 comprising using the retained candidate topic types as seed types and repeating a process of searching for topics in a different corpus of text documents to identify topics having one of the seed types, and for each identified topic, searching text near to the identified topic for matches to the at least one template, and when a template match is found which fills the placeholder for topic type, outputting contents of the placeholder as the candidate topic type.

13. The method of claim 1 comprising selecting at least one of the first or second topic types of the first node for display to a user based on a comparison of the probabilities of the first and second topic types.

14. The method of claim 1 further comprising selecting both the first topic type and the second topic type of the first node for display to a user.

15. A database construction apparatus comprising:
a processor;
a memory storing instructions that, when executed by the processor, perform a method for:
accessing a topic type hierarchy from text documents, the topic type hierarchy comprising types of topics;
labelling nodes with labels denoting a topic type from the topic type hierarchy, by,
for an individual one of the nodes representing a stored topic,
searching a text document for a match to at least one template, the template being a sequence of words and containing the stored topic and a placeholder for a stored topic type, wherein a template match fills the placeholder for the stored topic type such that contents of the filled placeholder comprise a candidate topic type,
wherein labelling the nodes further comprises:
labelling a first node with a first topic type and a second topic type; and
receiving, for the first and second topic types, a probability that the topic type applies to the first node from a topic type correctness model that has as input the candidate topic type and has as output an estimate of a likelihood of the candidate topic type being a correct topic type; and
storing a knowledge graph comprising the labelled nodes.

16. The database construction apparatus of claim 15 wherein the instructions are for receiving a query comprising a topic type, searching the knowledge graph to identify nodes having topic type labels corresponding to the topic type of the query, and outputting topics of the identified nodes.

17. The database construction apparatus of claim 15 wherein the instructions are for receiving a query comprising a topic, searching the knowledge graph to identify nodes within a specified number of hops away from a node representing the topic of the query, outputting a topic of at least one of the identified nodes and outputting a topic type of the at least one identified node.

18. A database construction apparatus comprising:
a processor; and
a memory storing instructions that, when executed by the processor, perform a method for:
accessing a topic type hierarchy from text documents, the topic type hierarchy comprising types of topics;
labelling a first node with a first topic type by,
searching a text document for a match to at least one template, the template being a sequence of words and containing a stored topic and a placeholder for a stored topic type, wherein a template match fills the placeholder for the stored topic type such that contents of the filled placeholder comprise a candidate topic type;
receiving a probability that the first topic type applies to the first node from a topic type correctness model that has as input the candidate topic type and has as output an estimate of a likelihood of the candidate topic type being a correct topic type; and
storing a knowledge graph comprising the labelled first node.

19. The database construction apparatus of claim 15 wherein the instructions are for filtering candidate topic types and retaining a specified number of most frequently occurring candidate topic types.

20. The database construction apparatus of claim 15 wherein the instructions are for receiving a selection of a topic type, filtering identified nodes, and including only identified nodes having a selected topic type.

* * * * *